United States Patent [19]

Kucera

[11] Patent Number: 5,075,071
[45] Date of Patent: Dec. 24, 1991

[54] CLEANING AND EXCAVATING TOOL FOR CONTROL ROD CANOPY SEALS

[75] Inventor: Richard A. Kucera, Monroeville, Pa.

[73] Assignee: Westinghouse Electric Corp., Pittsburgh, Pa.

[21] Appl. No.: 389,911

[22] Filed: Aug. 4, 1989

[51] Int. Cl.$^5$ .............................................. G21C 19/42
[52] U.S. Cl. ...................................... 376/310; 228/19
[58] Field of Search ............... 376/310, 233, 264, 268, 376/327, 353; 228/18, 19

[56] References Cited

U.S. PATENT DOCUMENTS

| | | | |
|---|---|---|---|
| 3,127,050 | 4/1960 | McDaniels, Jr. | 220/18 |
| 3,607,629 | 9/1971 | Frisch | 376/310 |
| 3,818,786 | 6/1974 | Leshem | 82/70.2 |
| 4,347,966 | 9/1982 | Feutrel | 228/173 F |
| 4,639,351 | 1/1987 | Förner | 376/310 |
| 4,830,814 | 5/1989 | Altman | 376/287 |

OTHER PUBLICATIONS

Patent Abstracts of Japan, vol. 11, No. 74 (M-568), Mar. 6, 1987.

*Primary Examiner*—Donald P. Walsh

[57] ABSTRACT

A device for cleaning and servicing a weld site about the periphery of a extending control rod drive mechanism and adapter tube including a housing adapted to be positioned adjacent to and rotated about the periphery of the control rod drive mechanism and a carriage assembly including an inner and outer portion reciprocably received within the housing is provided. Mounted within the housing is a first drive motor for driving a threaded lead screw rotatably mounted within the housing with an internally threaded follower secured to the carriage assembly and mating with the threaded lead screw for reciprocating the carriage assembly relative to the housing in a direction substantially parallel to the control rod drive mechanism. A second drive motor is reciprocably mounted within the carriage assembly for receiving and driving a tool attachment, and a third drive motor for reciprocating the second drive motor and the tool attachment in a direction substantially perpendicular to the control rod drive mechanism are provided. The third drive motor is similarly connected to a second lead screw rotatably mounted within the inner portion of the carriage assembly with a second internally threaded follower assembly mating with the lead screw for displacing the outer portion relative to the inner portion so that the tool attachment is remotely positioned relative to the control rod drive mechanism by operation of the first and third drive motors.

41 Claims, 5 Drawing Sheets

CLEANING AND EXCAVATING TOOL FOR CONTROL ROD CANOPY SEALS

BACKGROUND OF THE INVENTION

This invention generally relates to the servicing of the omega seal site where a control rod drive mechanism attaches to the adapter tube of a nuclear reactor head stalk, and is specifically concerned with the servicing of a canopy seal which is positioned about the omega seal site to contain the radioactive steam released in the event of an omega seal failure.

The core of a modern nuclear reactor of the type used to generate electrical power generally includes an upper internals assembly disposed over a lower core barrel. The lower core barrel houses an array of fuel rod assemblies which generate heat as a result of a controlled fission reaction that occurs in the uranium oxide pellets present in the individual fuel rods. Water is constantly circulated from the lower core barrel through the upper internals and out through outlet nozzles provided in the walls of an upper core barrel in order to transfer the heat generated by the fuel rod assemblies to heat exchangers which ultimately convert this heat into usable, nonradioactive steam.

The upper internals assembly includes an upper core barrel arranged in tandem with the lower core barrel of the reactor. The ceiling of the upper core barrel is formed from an upper support plate. The peripheral edge of this support plate is seated around the upper edge of the upper core barrel. Both the support plate and the upper core plate which underlies it include a plurality of apertures for both conducting the stream of hot, pressurized water exiting the fuel rod assemblies to the heat exchangers, as well as for conducting control rod assemblies. Separate guide tubes are provided between apertures in both the support and core barrel plates which are aligned with each other and with one of the fuel assemblies in the lower core barrel. The purpose of these guide tubes is to align and guide the relatively long and flexible rodlets of the control rod assemblies into a particular fuel assembly.

The rate of the fission reaction taking place within the fuel rod assemblies is regulated by means of the control rod assemblies. Each of these control rod assemblies is formed from an array of stainless steel tubes containing a neutron absorbing substance, such as silver, indium or cadmium. The stainless steel tubes (known as "rodlets" in the art) are suspended from a spider-like bracket. A reciprocable drive rod is connected to the spider-like bracket for either inserting or withdrawing the rodlets of the control rod assembly deeper into or farther out of each of the fuel rod assemblies in order to modulate the amount of heat generated thereby. These reciprocable drive rods are driven by control rod drive mechanisms which may be of the electromagnetic linear motion drive type devices or hydraulic drive type devices which move the control rods in incremental steps into and out of the reactor core. Each of the control rod drive mechanisms are attached to the reactor vessel head by way of adapter tubes, with the control rod drive mechanism being sealed to the adapter tube by way of an omega-type seal (so-called because of its resemblance in cross-section to the Greek letter omega).

Because hot, radioactive primary water is contained within the control rod drive mechanism, a leak may develop during the course of operation between the control rod drive mechanism and the adapter tube due to corrosion. Any such leak will promote further corrosion and lead to greater contamination around the area of the leak due to the radioactive steam released by the leak.

As is disclosed in co-pending application Ser. No. 376,512, filed July 7, 1989, to Horst Kweck and assigned to Westinghouse Electric Corporation, the disclosure of which is incorporated herein by reference, a system for positioning and remotely sealing a canopy seal about the omega seal site so as to contain any leakage that might exist between the control rod drive mechanism and the adapter tube has been developed. However, applicant has observed that once these canopy seals have been installed, they too may experience leakage about their extremity and require servicing, and as described in the above mentioned copending application, it is difficult to service such seals due to the limitation of space between the control rod drive mechanisms. Further, it has been noted that an improved original welding of the canopy seal about the control rod drive mechanism and adapter tube will be achieved if the surfaces of each of the members are prepared prior to the positioning and welding of the canopy seal.

Clearly from the above discussion, there is a need in the nuclear service industry for a mechanism which can efficiently and remotely prepare the surface of the control rod drive mechanism and the adapter tube to receive a canopy seal, and which can be utilized to remove flawed or ruptured welds, as well as one which can be used for aiding in the detection of the necessity of servicing procedures. In doing so, the down time, which typically costs the utility over $500,000 per day in lost revenues, will be minimized while further reducing service personnel exposure to radiation contamination.

SUMMARY OF THE INVENTION

Generally speaking, the present invention is a multifunctional tool designed to allow easy accessibility to the canopy seal and omega seal site. The tool initially provides for aiding in the installation of new canopy seals by cleaning the proposed weld area. The tool further provides for the detection and excavation of flawed welds about the previously positioned and welded canopy seals.

The foremost significance of the multi-functional tool is its accessibility to the limited area between the control rod drive mechanisms which are closely spaced above the nuclear reactor pressure vessel. The tool has the ability to maneuver between the control rod drive mechanisms by way of a cylindrical carousel which is secured about the control rod drive mechanism. This carousel, which is described in detail in the above mentioned co-pending application provides the tool with orbital movement about the canopy seal.

The tool may be adapted to perform a variety of functions in furthering the maintenance of the canopy seals. The attachment to be positioned within the tool and driven by an air motor will depend on the specific servicing function desired. A flapper wheel may be used initially to clean and prepare the surfaces of both the control rod drive mechanism and the adapter tube. In order for the satisfactory installation of new canopy sales, all the boron and other contaminants which have accumulated about the omega seal site must be removed so as to expose virgin metal necessary for the proper welding of the canopy seal in place.

Once the canopy seal has been secured in place and is operational, it too may experience leakage. A pathi attachment may be positioned within the tool for cleaning of excess developer during dipenetrant testing, a test for determining if leaks exist in the canopy seal welds. If such leaks are detected, a third attachment, namely a rotary burr may be positioned attachment, namely a rotary burr may be positioned within the tool and used as a grinder to remove flawed welds. Conceivably, a myriad of attachments could be adapted to be used with the tool.

The tool is capable of providing both vertical and horizontal movement to the attachment, while orbital movement about the seal is provided by the above mentioned carousel. Two motor driven lead screws are provided to position the attachments. The first lead screw being used to vertically position the air motor adjacent the canopy seal by selectively raising and lowering the air motor mount positioned in a lower portion of the tool. A second lead screw is provided for imparting horizontal movement to the air motor accommodating the particular attachment. This is carried out by a cam surface which is vertically maneuvered by the second lead screw which cooperates with a cam follower secured to the air motor. By vertically reciprocating the cam surface, the air motor will be proportionally horizontally reciprocated relative to the control rod drive mechanism and adapter tube.

By providing the above mentioned tool along with its many attachments, the welding surface of the control rod drive mechanism and adapter tube may be prepared and flawed welds may be serviced from a position remote from the leakage site. The tool will further allow the operator to maneuver about the leakage site and provide for both effective and efficient servicing at the leakage site. This will minimize and in most cases eliminate reactor vessel down time, and significantly reduce the radiation exposure of service personnel.

DETAILED DESCRIPTION OF THE PREFERRED EMBODIMENT

Figure 4:
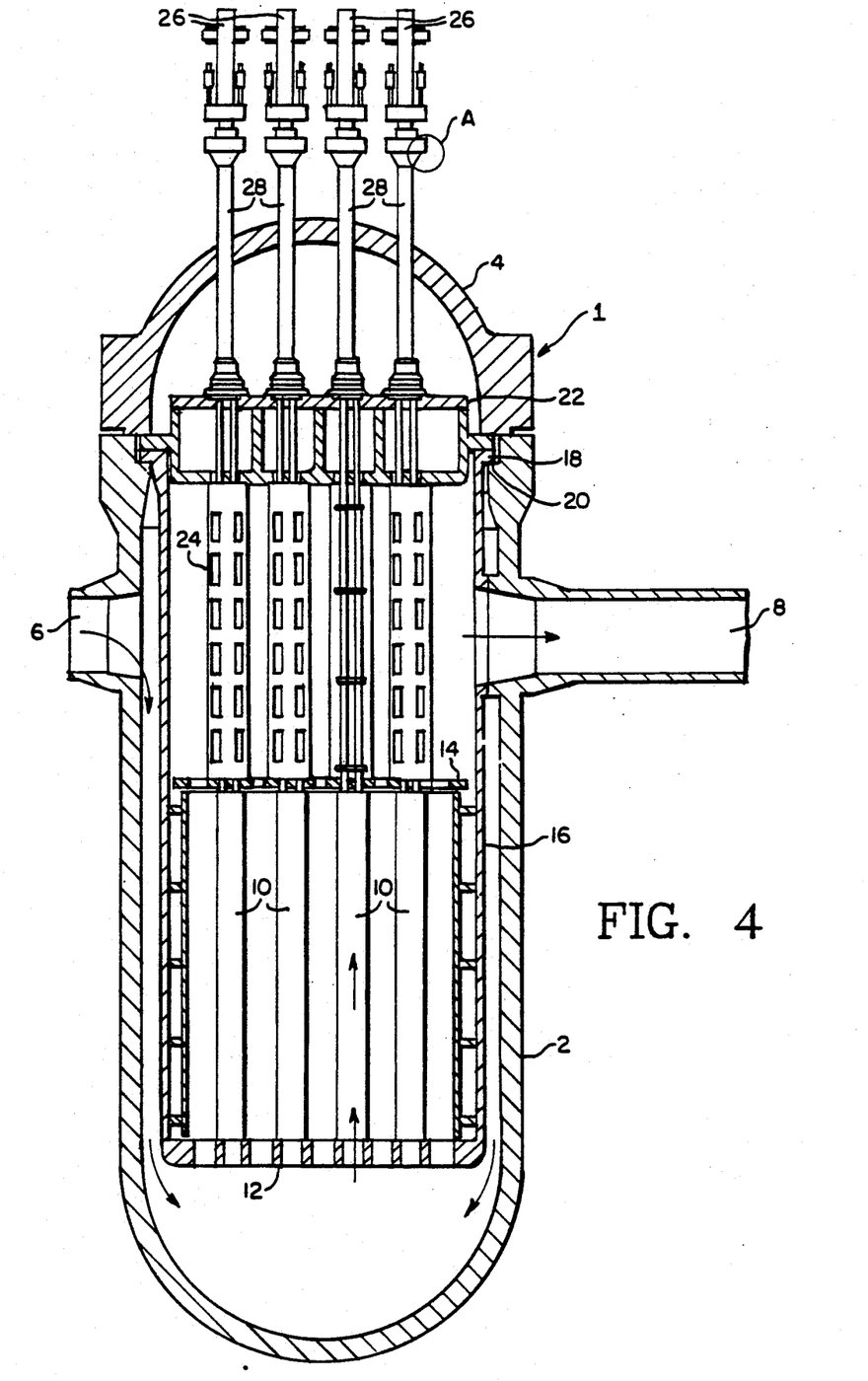
FIG. 4 is an elevational view of a nuclear reactor internals partially in section to which the present invention is adapted.

Referring to the drawings, and particularly to FIG. 4, the reactor 1 shown therein comprises a pressure vessel 2 having a removable closure head 4 attached to the pressure vessel 2 by a plurality of bolts (not shown). The pressure vessel 2 may be of a well known type suitable for containing a fluid coolant at a relatively high pressure. In the present case the coolant utilized is water; however, other suitable fluids may utilized as a coolant if desired. The pressure vessel 2 has an inlet nozzle 6 and outlet nozzle 8. The coolant is circulated through the reactor vessel in a manner well known in the art. Fuel assemblies 10 are mounted within the pressure vessel 2 between a lower core plate 12 and an upper core plate 14 which constitutes the reactor core. The lower core plate 12 is attached by welding to a core barrel 16 having an upper flange 18 which rest on a ledge 20 of the pressure vessel 2. The upper core plate 14 is supported from a deep-beamed upper support plate 22 by means of a plurality of support tubes 24.

The reactor is provided with control rod drive mechanisms 26 that may be of any conventional type including electromagnetic linear motion drive type devices or hydraulic drive type devices which move the control rods in incremental steps into and out of the reactor core. As was noted previously, of the control rod drive mechanisms 26 are attached to the closure head 4 by way of adapter tubes 28 with the control rod drive mechanism 26 being sealed to a respective adapter tube 28 by way of an omega seal 30 as shown in detail in FIG. 5.

Figure 5:
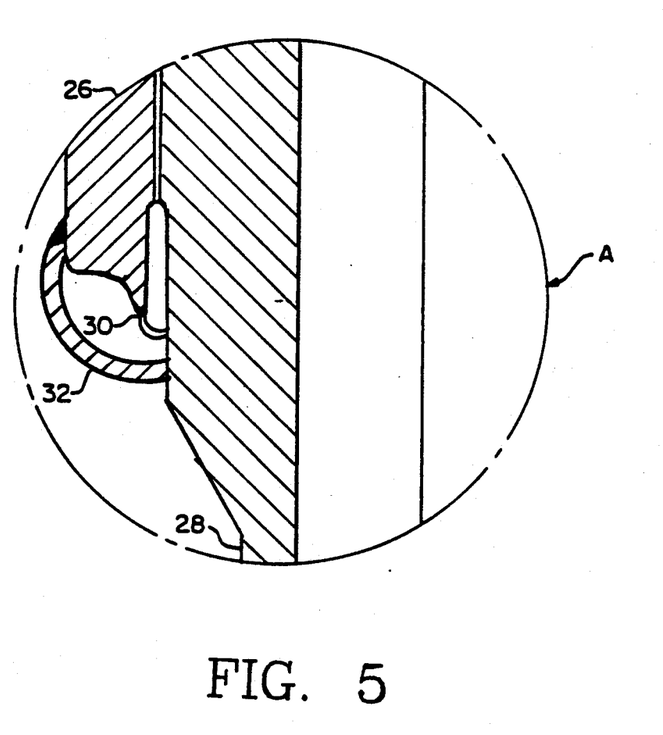
FIG. 5 is an exploded cross-sectional view of Area A of FIG. 4 with a canopy seal in place.

As can be seen from FIG. 5, the omega seal 30 is the original seal between the adapter tube 28 and the control rod drive mechanism 26. Further, as can be noted from FIG. 2, a canopy seal 32 having a semi-circular cross-section is positioned and secured so as to enclose the entire periphery of the omega seal 30. Prior to the positioning and securing of the canopy seal 30 about the omega seal site, it is beneficial to thoroughly clean the site to remove any boron or other contaminants which have accumulated in this area in order to expose the virgin metal necessary for the satisfactory installation of the new canopy seal. Further, after a canopy seal 32 has been properly secured, a flaw in the weld about the canopy seal 32 may be detected and require replacement.

Figure 1:
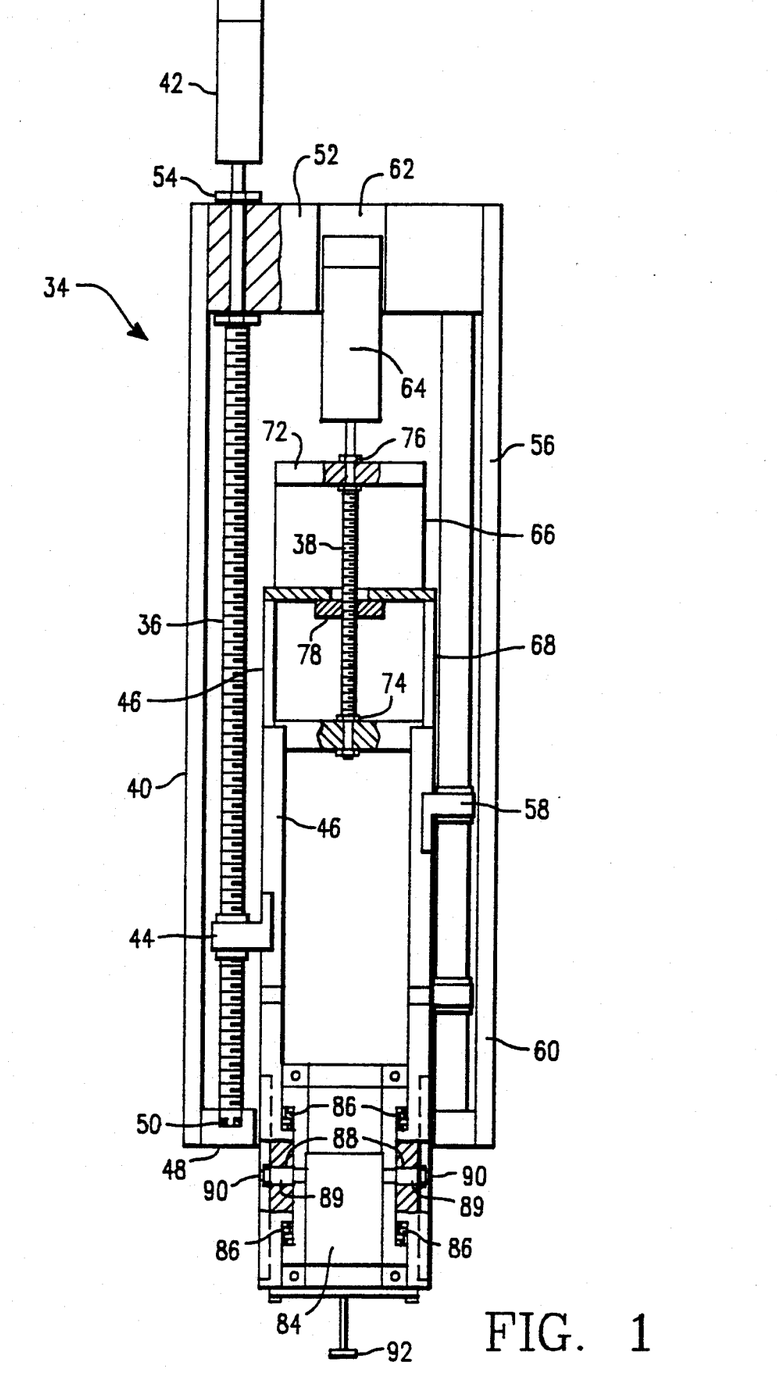
FIG. 1 is an elevational view of the tool in accordance with the preferred embodiment of the invention.

In order to perform the above-mentioned functions, a canopy seal cleaning and excavating tool 34 as is shown in FIG. 1 is provided. The canopy seal cleaning and excavating tool 34 is multi-functional device which is designed to allow easy accessibility to the canopy seals. As can be seen from FIG. 1, the tool 34 includes two motor driven lead screws 36 and 38 which impart the desired movement to the excavated tool 34. The tool itself is of a small size in comparison to the control rod drive mechanism such that it can be easily maneuvered between these mechanisms in order to service the canopy seal area. Lead screw 36 is provided to extend the entire length of the stationary housing 40. It is the stationary housing 40 which is adapted to be fixedly connected to a cylindrical carousel which is positioned about the control rod mechanism as is discussed in the previously mentioned co-pending application. The housing 40 may be attached to the carousel in any manner; however, the use of a cooperating dovetail structure is preferred in that by the use of such a structure, the canopy seal cleaning and excavating tool 34 may be readily positioned on and removed from the carousel when desired.

The lead screw 36 is rotationally driven in either the clockwise or counterclockwise direction by way of the remotely controlled motor 42. Adapted to cooperate with the lead screw 36 is a follower 44 which is fixedly secured to a carriage 46. Rotation of the lead screw 36 in either the clockwise or counterclockwise direction will result in the vertical upward or downward movement of the carriage 46 with respect to the housing 40. In order to allow for the rotational movement of the lead screw 36, its lower end is mounted within the support plate 48 by way of bearings 50. Further, lead screw 36 is accommodated within the upper support plate 52 by way of a split hub clamp 54. It should be noted that the lead screw 36 may be accommodated within the support plates 48 and 52 in any known manner so as to allow the lead screw to freely rotate therebetween. The support plate 52 additionally supports the motor 42 which provides the necessary rotation to the lead screw 36 in order to manipulate the carriage 46.

A guide rod 56 is further provided between the support plates 48 and 52 in order to aid in guiding the carriage 46 during its vertical movement. A pair of guide rod followers 58 and 60, which are fixedly secured to carriage 46, are adapted to reciprocate along the guide rod 56 in order to aid in the vertical movement of the carriage 46.

As can be noted from FIG. 1, the support plate 52 is provided with a central bore 62 therethrough so as to accommodate a drive motor 64 during the vertical reciprocation of the carriage 46. The drive motor 64 is similar to that of drive motor 42 and provides rotational movement to the lead screw 38 as will be discussed in greater detail hereinbelow.

Figure 2:
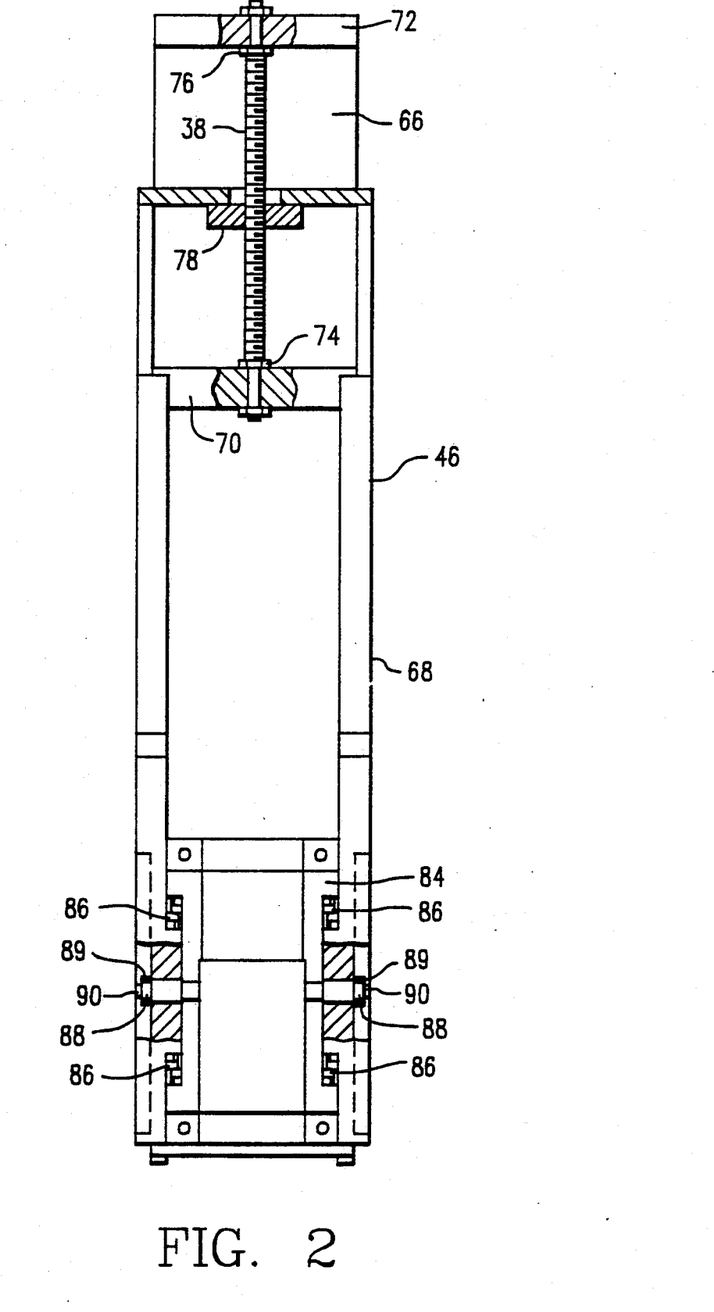
FIG. 2 is an expanded elevational view of the mechanism for imparting horizontal movement in accordance with the preferred embodiment of the invention.
Figure 3A:
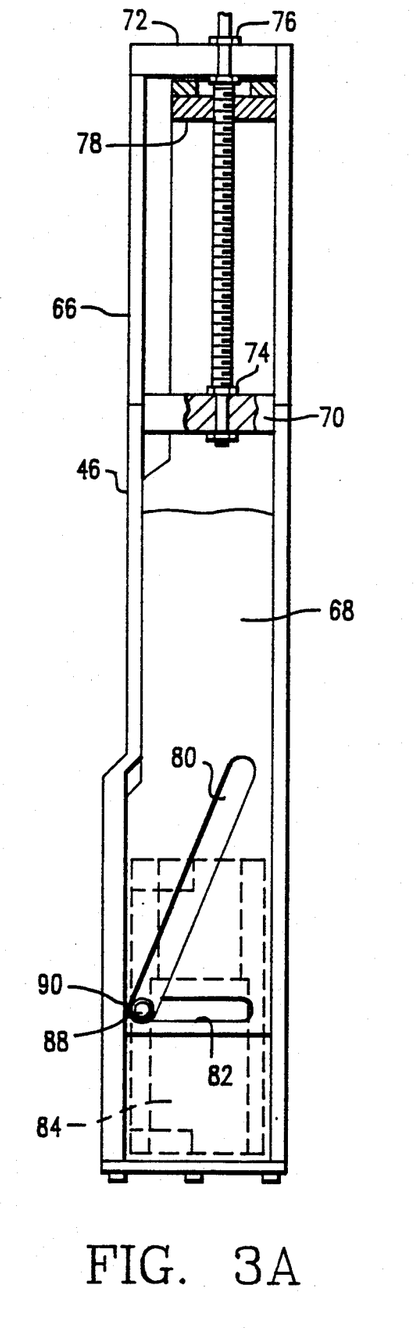
FIG. 3A is a side elevational view of the mechanism shown in FIG. 2.
Figure 3B:
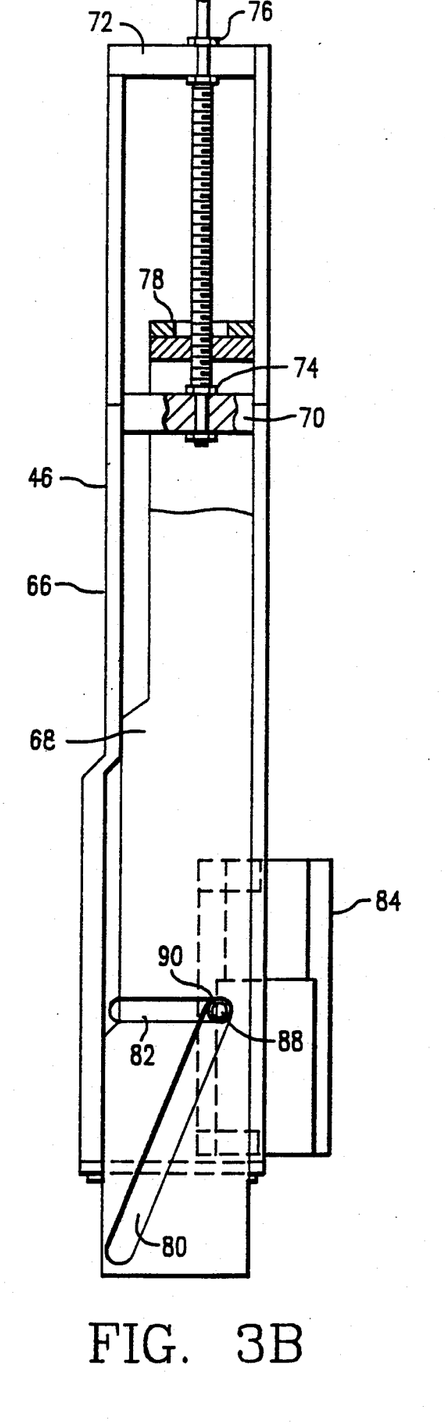
FIG. 3B is a side elevation view of the mechanism of FIG. 2 in the horizontally extended condition.

Turning now to FIGS. 2 and 3, the carriage 46 will be discussed in greater detail. The carriage 46 is composed of a two piece housing, inner portion 66 and an outer portion 68 which may be reciprocated relative to the inner portion 66 by way of the lead screw 38 and motor 64, as shown in FIG. 1. The lead screw 38 is mounted within the inner portion 66 between support plates 70 and 72 by way of a pair of split hub clamps 74 and 76. The outer portion 68 is capable of reciprocating relative to the inner portion 66 by way of the through rod nut and flange 78 which is secured to the outer portion 68 and includes inner threads which cooperate with the threads of the lead screw 38 in order to drive the outer portion upwards or downwards relative to the inner portion 66.

As can be seen from FIG. 3A, the outer portion 68 includes a slanted cam slot 80 at an angle of approximately 22 ½ degrees relative to the axis of the lead screw 38. Further, the inner portion 66 includes a cam slot 82 which is formed at an angle normal to the vertical axis of the lead screw 38. The carriage 46 is provided with a reciprocatable air motor 84 mounted in a lower portion thereof which is capable of moving in the horizontal direction along the linear bearings 86. The housing of the air motor 84 is provided with a pair of bearing studs 88 extending from a lateral side thereof, with the main portion of the bearing stud 88 being accommodated by cam slot 82 and the extreme end portion 90 of the bearing stud extending into and being accommodated by the cam slot 80. The end portion 90 of the bearing stud is provided with ring bearings so as to allow for the smooth motion of the bearing stud 88 within the cam slot 80.

It is the air motor 84 which provides the rotational movement to the various attachments 92 which may be accommodated therein. The attachment 92 to be positioned within the tool and driven by the air motor 84 will depend on the specific servicing function desired. A flapper wheel may be used initially to clean and prepare the surfaces of both the control rod drive mechanism and the adapter tube. In order for the satisfactory installation of new canopy sales, all the boron and other contaminants which have accumulated about the omega seal site must be removed so as to expose virgin metal necessary for the proper welding of the canopy seal in place. Once the canopy seal 32 has been secured in place and is operational, it too may experience leakage. A pathi attachment may be positioned within the tool for the cleaning of excess developer during dipenatrant testing, a test for determining if leaks exist in the canopy seal welds. If such leaks are detected, a third attachment, namely a rotary burr may be positioned within the tool and used as a grinder to remove flawed welds. Conceivably, a myriad of attachments could be adapted to be used with the tool.

As can be seen from FIGS. 3A and 3B, a downward movement of the through rod nut and flange 78 relative to the lead screw 38 will cause the cam slot 80 to likewise move in a downward direction. In doing so, the end portion 90 of the bearing stud 88 will be forced by way of the cam slot 80 in a horizontal direction along cam slot 82. The lead screw 38 is rotated in a desired direction and in a desired amount in order to position the air motor 84 and subsequently of the attachment accommodated therein in the appropriate desired position.

The operation of the canopy seal cleaning and excavating tool 34 will now be described in detail. The tool 34 is initially secured in a fixed position on the carousel as previously described. Once in this position, the tool 34 may be rotated about a central axis of the control rod drive mechanism, so as to locate the tool 34 in a desired position about the periphery of the canopy seal. The tool is then vertically lowered by way of actuation of the drive motor 42 which in turn rotates the lead screw 36 so as to vertically displace the carriage 46 by way of the follower 44. Once the desired vertical positioning of the carriage has been achieved, the drive motor 64 is actuated in either a clockwise or counterclockwise motion in order to horizontally position the air motor 84 relative to the carriage 46. By rotating the drive motor 64, lead screw 38 is likewise rotated which imparts vertical movement to the outer portion 68 of the carriage 46 by way of the through rod nut and flange 78. By moving the outer portion 68 either upwardly or downwardly, the cam slot 80 is moved relative to the air motor 84. This, in turn, forces the bearing stud 88 to move in the horizontal direction along cam slot 82 and subsequently forces the air motor 84 to move in the horizontal direction in order to properly position the attachment which is accommodated therein. Each of the above mentioned motions, i.e., the orbital, vertical and horizontal movement of the air motor and attachment may be carried out simultaneously in order to move the attachment in a desired manner during the working process.

In closing, as can be seen from the foregoing, the canopy seal cleaning and excavating tool 34 may be readily maneuvered about the control rod drive mechanisms and adaptor tube so as to maintain these areas. By providing such a canopy seal cleaning and excavating tool, the welding surface of the control rod drive mechanism and the adaptor tube may be prepared prior to the securing of the canopy seals and flawed welds which occur about the canopy seals may be serviced from a position remote from the leakage site. This will provide for both effective and efficient servicing of the canopy seal site. By providing such a remote operation, reactor vessel down time will be minimized and in most cases eliminated while significantly reducing the radiation exposure of service personnel.

I claim:

1. A device for servicing a weld site about the periphery of a control rod drive mechanism, comprising
   a housing adapted to be rotated about the periphery of said control rod drive mechanism;
   a carriage reciprocably received within said housing;
   first movement means for reciprocating said carriage in a first direction;
   a tool attachment reciprocably received within said carriage; and
   second movement means for reciprocating said tool in a second direction;
   wherein said tool attachment is positioned relative to said control rod drive mechanism by said first and second movement means.

2. The device as defined in claim 1, further comprising an orbiting means for rotating said housing about the periphery of said control rod drive mechanism, wherein said housing is removably attached to said orbiting means.

3. The device as defined in claim 1, wherein said first movement means includes a threaded lead screw rotatably mounted within said housing and a follower fixedly secured to said carriage and displaceable by rotation of said lead screw.

4. The device as defined in claim 3, wherein said follower includes an internally threaded portion which mates with said threaded lead screw so that rotation of said lead screw moves said carriage in a linear direction relative to said housing.

5. The device as defined in claim 3, further comprising a drive means supported by said housing for rotating said threaded lead screw.

6. The device as defined in claim 3, further comprising a guide rod mounted in said housing substantially parallel to said lead screw, and at least one guide rod follower fixedly secured to said carriage for guiding said carriage within said housing.

7. The device as defined in claim 1, further comprising a drive means for rotatably driving said tool attachment, wherein said tool attachment is removably accommodated by said drive means and said drive means is reciprocably mounted within said carriage.

8. The device as defined in claim 7, wherein said drive means is a remote controlled air motor.

9. The device as defined in claim 7, wherein said carriage comprises an inner portion and an outer portion, with said drive means being reciprocably mounted within said inner portion.

10. The device as defined in claim 9, wherein said second movement means displaces said outer portion relative to said inner portion.

11. The device as defined in claim 10, wherein said second movement means includes a threaded lead screw rotatably mounted within said inner portion of said carriage, and said outer portion includes a follower fixedly secured to said outer portion of said carriage and displaceable by rotation of said lead screw.

12. The device as defined in claim 11, wherein said follower includes an internally threaded portion which mates with said threaded lead screw, so that rotation of said lead screw displaces said outer portion in a linear direction relative to said inner portion.

13. The device as defined in claim 12, further comprising at least one bearing stud extending laterally from said drive means.

14. The device as defined in claim 13, wherein said inner portion includes a first cam slot extending in a direction substantially perpendicular to said linear direction for accommodating said bearing stud.

15. The device as defined in claim 14, wherein said outer portion includes a second cam slot extending at an angle relative to both said linear direction and said substantially perpendicular direction for further accommodating said bearing stud so that reciprocation of said outer portion and said second cam slot forces said bearing stud and said drive means along said first cam slot in a direction substantially perpendicular to said linear direction.

16. The device as defined in claim 1, wherein said tool attachment is selected from a group including a rotary burr, a flapper wheel and a pathi attachment.

17. A device for cleaning and servicing a weld site about the periphery of a substantially vertically extending control rod guide mechanism and adapter tube, comprising;
   a housing adapted to be positioned adjacent to and rotated about the periphery of the control rod drive mechanism;
   a carriage assembly reciprocably received within said housing;
   a first drive means for reciprocating said carriage assembly in a direction substantially parallel to said control rod drive mechanism;
   a second drive means reciprocably accommodated within said carriage assembly for receiving and driving a tool attachment; and
   a third drive means for reciprocating said second drive means and said tool attachment in a direction substantially perpendicular to said control rod drive mechanism,
   wherein said tool attachment is remotely positioned relative to said control rod drive mechanism by said first and third drive means.

18. The device as defined in claim 17, further comprising an orbiting means for rotating said housing about the periphery of said control rod drive mechanism, wherein said housing is removably attached to said orbiting means.

19. The device as defined in claim 17, wherein said first drive means includes a threaded lead screw rotatably mounted within said housing and a drive motor for remotely driving said lead screw.

20. The device as defined in claim 17, further comprising a follower fixedly secured to said carriage assembly and having an internally threaded portion which mates with said threaded lead screw, wherein rotation of said threaded lead screw reciprocates said carriage assembly in said direction substantially parallel to said control rod drive mechanism.

21. The device as defined in claim 20, further comprising a guide rod mounted in said housing substantially parallel to said lead screw, and at least one guide rod follower fixedly secured to said carriage assembly for guiding said carriage assembly within said housing.

22. The device as defined in claim 17, wherein said second drive means is a remote controlled air motor.

23. The device as defined in claim 17, wherein said carriage assembly comprises an inner portion and an outer portion with said second drive means being reciprocably mounted within said inner portion.

24. The device as defined in claim 23, wherein said third drive means includes a threaded lead screw rotatably mounted within said inner portion and an internally threaded follower fixedly secured to said outer portion and in mating relationship with said lead screw, so that rotation of said lead screw displaces said outer portion in a direction substantially parallel to said control rod drive mechanism.

25. The device as defined in claim 24, further comprising at least one bearing stud extending laterally from said second drive means, wherein said inner portion includes a first cam slot extending in a direction substantially perpendicular to said control rod drive mechanism for accommodating said bearing stud and said outer portion includes a second cam slot extending at an angle relative to both said control rod drive mechanism and said first cam slot for further accommodating said bearing stud so that reciprocation of said outer portion and said second cam slot forces said bearing stud and said second drive means along said first cam slot to position said tool attachment relative to said control rod drive mechanism.

26. The device as defined in claim 17, wherein said tool attachment is selected from a group including a rotary burr, a flapper wheel and a pathi attachment.

27. A device for cleaning and servicing a weld site about the periphery of a substantially vertically extending control rod drive mechanism and adapter tube, comprising;
   a housing adapted to be positioned adjacent to and rotated about the periphery of the control rod drive mechanism;
   a carriage assembly reciprocably received within said housing;
   a first drive means including a threaded lead screw rotatably mounted within said housing, a drive motor supported by said housing and an internally threaded follower fixedly secured to said carriage assembly for mating with said threaded lead screw for reciprocating said carriage assembly relative to said housing in a direction substantially parallel to the control rod drive mechanism;
   a second drive means reciprocably mounted within said carriage assembly for receiving and driving a tool attachment; and
   a third drive means for reciprocating said second drive means and said tool attachment in a direction substantially perpendicular to said control rod drive mechanism;
   wherein said tool attachment is remotely positioned relative to said control rod drive mechanism by said first and third drive means.

28. The device as defined in claim 27, further comprising an orbiting means for rotating said housing about the periphery of said control rod drive mechanism, wherein said housing is removably attached to said orbiting means.

29. The device as defined in claim 27, further comprising a guide rod mounted in said housing substantially parallel to said lead screw, and at least one guide rod follower fixedly secured to said carriage assembly for guiding said carriage assembly within said housing.

30. The device as defined in claim 27, wherein said second drive means is a remote controlled air motor.

31. The device as defined in claim 27, wherein said carriage assembly comprises an inner portion and an outer portion with said second drive means being reciprocably mounted within said inner portion.

32. The device as defined in claim 31, wherein said third drive means includes a threaded lead screw rotatably mounted within said inner portion and an internally threaded follower fixedly secured to said outer portion and in mating relationship with said lead screw, so that rotation of said lead screw displaces said outer portion in a direction substantially parallel to said control rod drive mechanism.

33. The device as defined in claim 32, further comprising at least one bearing stud extending laterally from said second drive means, wherein said inner portion includes a first cam slot extending in a direction substantially perpendicular to said control rod drive mechanism for accommodating said bearing stud and said outer portion includes a second cam slot extending at an angle relative to both said control rod drive mechanism and said first cam slot for further accommodating said bearing stud so that reciprocation of said outer portion and said second cam slot forces said bearing stud and said second drive means along said first cam slot to position said tool attachment relative to said control rod drive mechanism.

34. The device as defined in claim 27, wherein said tool attachment is selected from a group including a rotary burr, a flapper wheel and a pathi attachment.

35. A device for cleaning and servicing a weld site about the periphery of a substantially vertically extending control rod drive mechanism and adapter tube, comprising;
   a housing adapted to be positioned adjacent to and rotated about the periphery of the control rod drive mechanism;
   a carriage assembly including an inner portion and an outer portion reciprocably received within said housing;
   a first drive means including a first threaded lead screw rotatably mounted within said housing, a drive motor supported by said housing and a first internally threaded follower fixedly secured to said carriage assembly for mating with said threaded lead screw for reciprocating said carriage assembly relative to said housing;
   a second drive means reciprocably mounted within said inner portion of said carriage assembly for receiving and driving a tool attachment; and
   a third drive means including a second threaded lead screw rotatably mounted within said inner portion and a second internally threaded follower fixedly secured to said outer portion and in mating relationship with said second lead screw for reciprocating said outer portion relative to said inner portion and said second drive means with said tool attachment relative to said inner portion of said carriage assembly;
   wherein rotation of said first threaded lead screw displaces said carriage assembly in a direction substantially parallel to said control rod drive mechanism and rotation of said second lead screw displaces said second drive means and said tool attachment in a direction substantially perpendicular to said control rod drive mechanism to remotely position said tool attachment relative to said control rod drive mechanism.

36. The device as defined in claim 35, further comprising an orbiting means for rotating said housing about the periphery of said control rod drive mechanism, wherein said housing is removably attached to said orbiting means.

37. The device as defined in claim 35, further comprising a guide rod mounted in said housing substantially parallel to said first lead screw, and at least one guide rod follower fixedly secured to said carriage assembly for guiding said carriage assembly within said housing.

38. The device as defined in claim 35, wherein said second drive means is a remote controlled air motor.

39. The device as defined in claim 35, further comprising at least one bearing stud extending laterally from said second drive means, wherein said inner portion includes a first cam slot extending in a direction substantially perpendicular to said control rod drive mechanism for accommodating said bearing stud and said outer portion includes a second cam slot extending at an angle relative to both said control rod drive mechanism and said first cam slot for further accommodating said bearing stud so that reciprocation of said outer portion and said second cam slot forces said bearing stud and said second drive means along said first cam slot to position said tool attachment relative to said control rod drive mechanism.

40. The device as defined in claim 35, wherein said tool attachment is selected from a group including a rotary burr, a flapper wheel and a pathi attachment.

41. A device for servicing a weld site about the periphery of a cylindrical member comprising
   a housing adapted to be positioned adjacent the cylindrical member;
   a tool attachment;
   a tool attachment drive means reciprocably received within said housing for driving said tool attachment;
   a first movement means for reciprocating said tool attachment drive means in a first direction; and
   a second movement means for reciprocating said tool attachment drive means in a second direction substantially perpendicular to said first direction to position said tool attachment relative to the weld site.

* * * * *